Dec. 17, 1935.   J. W. CONNELL   2,024,339
WATER SPRAYING DEVICE
Filed Nov. 11, 1933
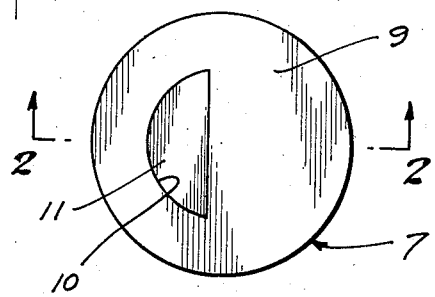
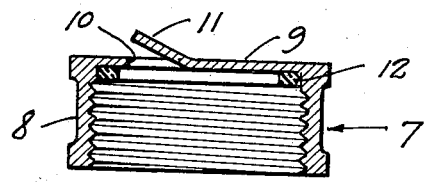
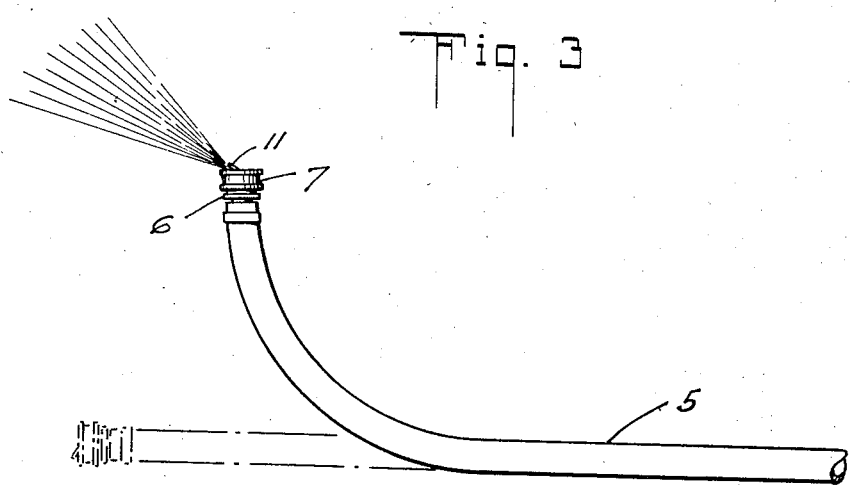
INVENTOR
James W. Connell
BY Ernest L. Wallace
ATTORNEY Patented Dec. 17, 1935

2,024,339

UNITED STATES PATENT OFFICE 2,024,339

WATER SPRAYING DEVICE

James W. Connell, Temple City, Calif.

Application November 11, 1933, Serial No. 697,667

4 Claims. (Cl. 299—121)

This invention relates to a spraying cap or head connected to the end of a flexible hose. It is adapted to act upon a hose lying prone upon the ground so as to erect the end of the latter and project a spray laterally, maintaining the end in erect position. It has been a common practice to provide sprinkler heads for connection to flexible hose and in order to maintain the head in a selected position so as to spray an area of surface, to provide bases or supports for rigidly holding the nozzle in its selected positions. Independent supports have been used and also supports formed as a part of the spray head. Obviously, such devices are expensive and many require a certain amount of work in their placement. The present invention contemplates incorporation in a simple, compact and inexpensive structure, which may be attached to the nipple at the end of the hose and may be conveniently moved from place to place by dragging the hose.

These objects together with other objects apparent from the subjoined description are obtained by the embodiment of my invention illustrated in the accompanying drawing, in which:—

Fig. 1 is a plan view of a sprinkling cup; Fig. 2 is an axial sectional view through the cap; and Fig. 3 shows in full lines the cap attached to a hose and erect as in sprinkling, the dotted lines showing the position of the hose and cap before the water is turned on.

Referring with more particularity to the drawing, an ordinary flexible hose, such as is used in sprinkling gardens and lawns is indicated by 5. It is provided with a male coupling nipple 6. Mounted on nipple 6 is my cap 7.

The cap 7 comprises a cylindrical shell 8 having internal threads to enable it to be attached to nipple 6. The end of the shell has a wall 9 preferably of thin disk form. This structure described may be formed of die pressed metal. An arcuate cut 10 is made in the end wall and the lip 11 formed thereby is bent outwardly at an angle so as to overhang the opening below. The usual gasket 12 is shown.

It will be noted that the bore of the cap is interrupted so that the water issuing is not baffled and substantially no eddies are formed. Water passes through the opening in an axial direction with respect to the hose and strikes the lip 11 being deflected laterally and as it leaves the edge of the lip and directed in a fan shaped spray. Due to the inclined underface of the lip 11 the water reacts to urge the cap laterally in relation to its longitudinal axis.

The cap 7 is attached to hose 5 and the latter allowed to lie prone on the ground before the water is admitted to the hose. The hose should be turned so that the lip is directed toward the ground. This position may be obtained by twisting the hose to properly position cap 7, but the twist should be distributed so that there is substantially no tendency for the hose to return. Such position is shown in dotted lines in Fig. 3. The water is now turned on. The stream of water tends to maintain the hose straight and this tendency is proportionate to the rate of flow. The water issuing from cap 7 reacts on the lip tending to raise the hose. The magnitude of the reaction is proportionate to the area of the lip, its angle and to the rate of flow of the stream. Obviously the dimensions of the lip and angle should be proportioned so that the force urging erection of the hose will be sufficient to raise the latter to an erect position. This tendency to erect may be varied by controlling the flow at the control valve for the hose so that the hose will not pass vertical position. The hose will be maintained erect by the issuing water. In the event that the lip is not initially properly directed for erection, the hose may be twisted after the water has been turned on. Obviously, the hose may be dragged to change the position of the spray head for watering different zones.

What I claim is:—

1. In a water spraying device, a spray nozzle comprising a cylindrical threaded member adapted to be positioned at the end of a conduit, an end wall across the end of said threaded member, a tang being struck outwardly from said end wall and having an arcuate edge whereby an opening representing the segment of a circle will be formed through the end wall to permit outward flow of liquid.

2. In a waterspraying device, a spray nozzle comprising a cylindrical threaded member adapted to be positioned at the end of a conduit, an end wall across the end of said threaded member, a tang being struck outwardly from said end wall and having an arcuate edge whereby an opening representing the segment of a circle will be formed through the end wall to permit outward flow of liquid, said tang being disposed at an angle to the normal plane of said end wall.

3. In a water spraying device, a spray nozzle comprising a cylindrical threaded member adapted to be positioned at the end of a conduit, an end wall across the end of said threaded member, a tang being struck outwardly from said end wall and having an arcuate edge whereby an opening representing the segment of a circle will be formed through the end wall to permit outward flow of liquid, said tang being disposed at an angle to the normal plane of said end wall.

4. A spray nozzle comprising a cylindrical threaded portion adapted to be connected with the end of a conduit, and having a relatively flat end wall, the end wall being formed with an opening through it to provide a tang having an arcuate edge disposed at an angle to the normal plane of the end wall and to define a segmental shaped passageway through which a liquid may be projected.

JAMES W. CONNELL.